United States Patent
Davidson, Jr.

(10) Patent No.: US 11,034,595 B1
(45) Date of Patent: *Jun. 15, 2021

(54) SYSTEM AND METHOD FOR WATER PURIFICATION

(71) Applicant: Leon John Davidson, Jr., Atkinson, NH (US)

(72) Inventor: Leon John Davidson, Jr., Atkinson, NH (US)

(*) Notice: Subject to any disclaimer, the term of this patent is extended or adjusted under 35 U.S.C. 154(b) by 0 days.

This patent is subject to a terminal disclaimer.

(21) Appl. No.: 17/155,153

(22) Filed: Jan. 22, 2021

Related U.S. Application Data

(63) Continuation-in-part of application No. 16/998,086, filed on Aug. 20, 2020, now Pat. No. 10,954,143.

(51) Int. Cl.
| | | |
|---|---|---|
| C02F 1/02 | (2006.01) | |
| C02F 1/00 | (2006.01) | |
| C02F 1/32 | (2006.01) | |
| C02F 103/00 | (2006.01) | |
| A23B 5/005 | (2006.01) | |
| C02F 11/12 | (2019.01) | |

(52) U.S. Cl.
CPC .............. *C02F 1/02* (2013.01); *C02F 1/006* (2013.01); *A23B 5/0052* (2013.01); *C02F 1/32* (2013.01); *C02F 11/12* (2013.01); *C02F 2103/005* (2013.01); *C02F 2209/02* (2013.01); *C02F 2209/29* (2013.01)

(58) Field of Classification Search
None
See application file for complete search history.

(56) References Cited

U.S. PATENT DOCUMENTS

| | | | | |
|---|---|---|---|---|
| 4,664,793 A | * | 5/1987 | Murakami | F24D 17/0078 210/181 |
| 10,954,143 B2 | * | 3/2021 | Davidson, Jr. | C02F 9/00 |
| 2002/0189173 A1 | * | 12/2002 | Staschik | C02F 9/00 52/79.1 |
| 2005/0139530 A1 | * | 6/2005 | Heiss | C02F 9/00 210/85 |
| 2007/0138081 A1 | * | 6/2007 | Rice | B08B 3/02 210/257.2 |
| 2014/0053580 A1 | * | 2/2014 | Ferreira | C02F 1/045 62/80 |
| 2015/0008167 A1 | * | 1/2015 | Shturm | C02F 1/325 210/85 |

* cited by examiner

*Primary Examiner* — Richard C Gurtowski
(74) *Attorney, Agent, or Firm* — Catherine Napjus; Michael Persson; Chisholm, Persson & Ball, PC

(57) ABSTRACT

The present invention is a water purification system and method including a treatment tank with a water inlet, a chlorine source, and a heating element; at least one storage tank with at least one treated water outlet between the treatment tank and the storage tank(s) through which treated water passes therebetween, and a final water outlet(s) through which treated water leaves the system for the benefit of the end user. A power source powers all elements that require power, such as the heating element.

21 Claims, 4 Drawing Sheets

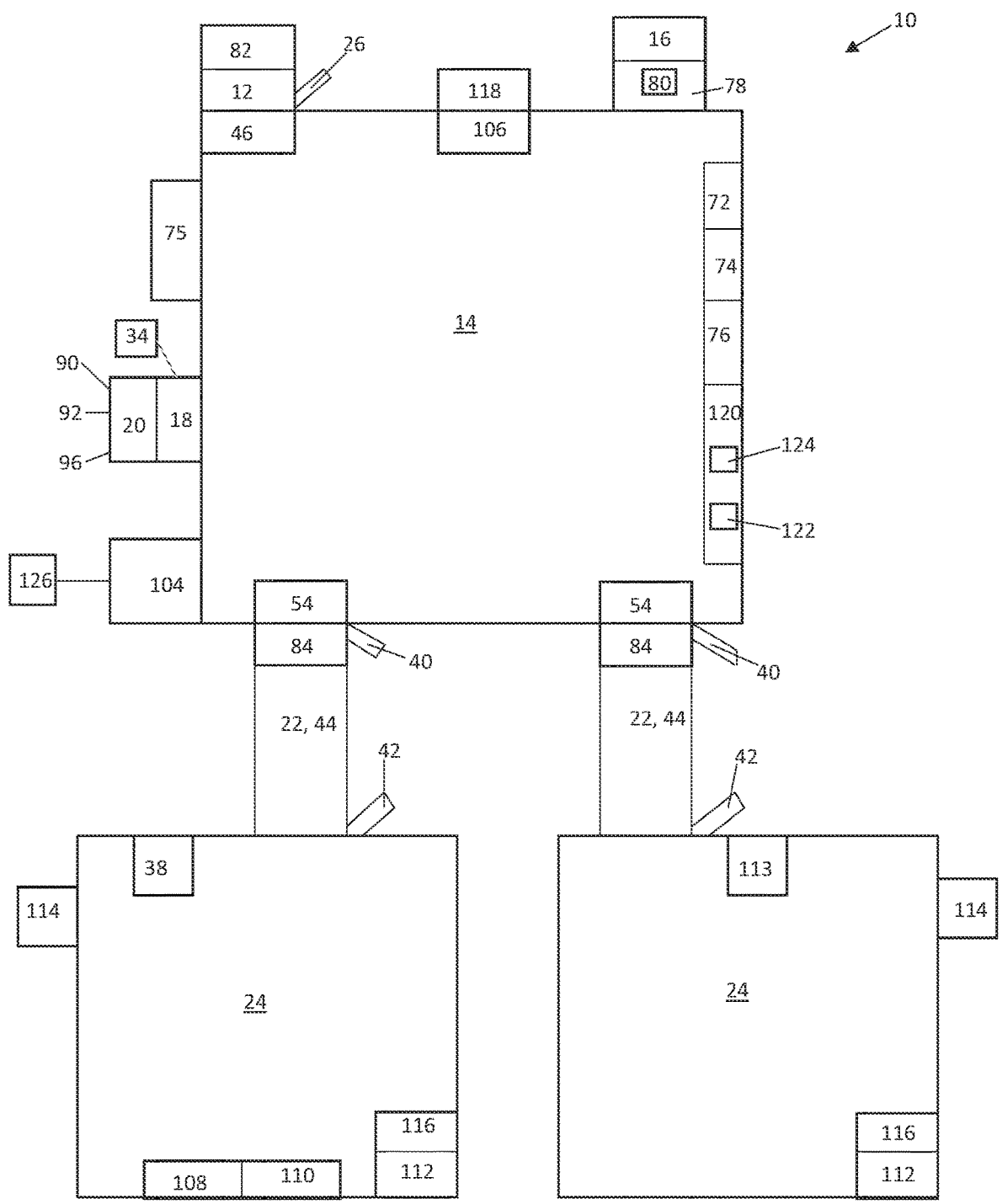

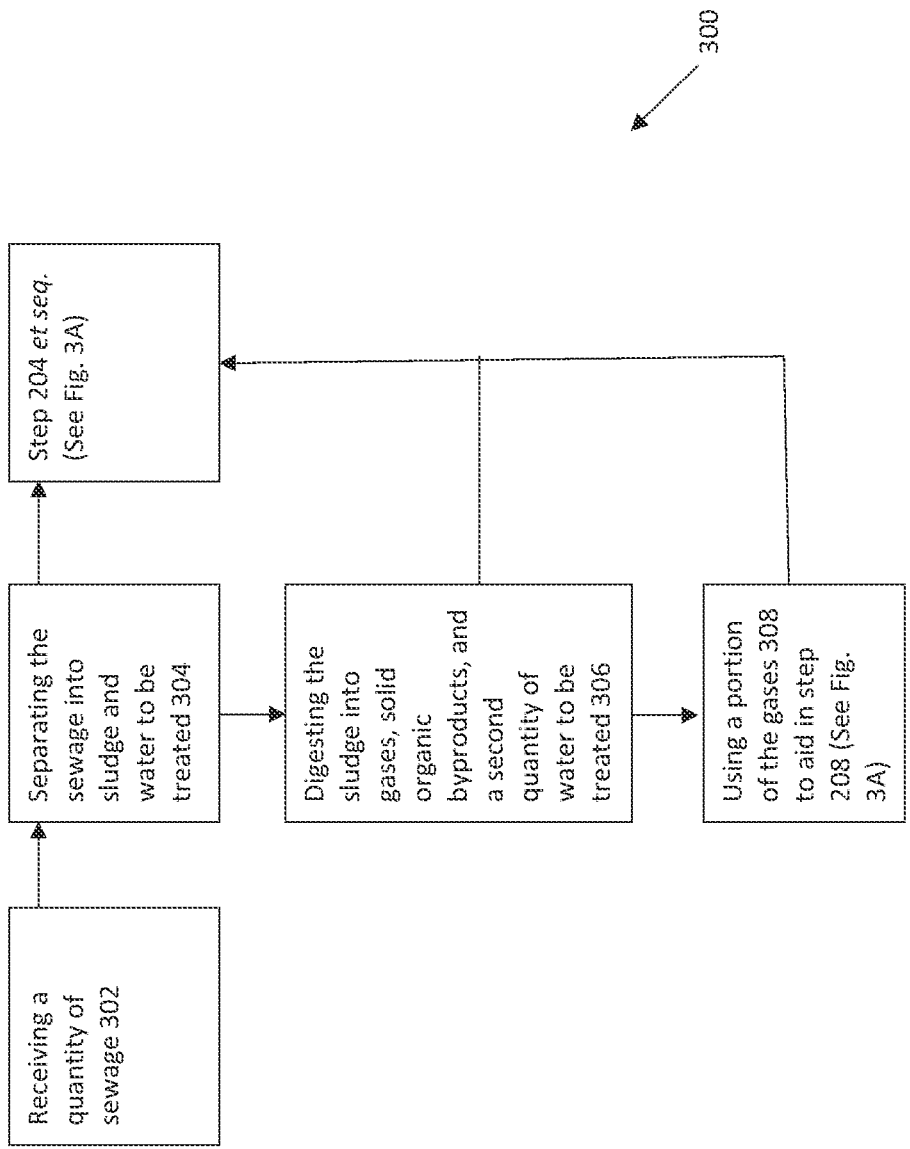

SYSTEM AND METHOD FOR WATER PURIFICATION

CLAIM OF PRIORITY

This application claims the benefit of priority of co-pending U.S. patent application Ser. No. 16/998,086, filed on Aug. 20, 2020.

FIELD OF THE INVENTION

The present invention relates generally to water purification methods and systems and specifically to those that use chlorine and then inactivate the chlorine.

BACKGROUND

Water contamination has caused disease in the human population for as long as there has been a human population. In modern times, while water quality varies widely depending on geography, all water sources are susceptible to contamination to some extent. Indeed, as discussed below, measures to decontaminate water often are themselves contaminants.

Original water sources are typically groundwater or surface water. Groundwater may be stored in underground geologic formations and pumped from this subterranean source via a well or wells. In such situations, groundwater is susceptible to inorganic contaminants, such as radon, arsenic, uranium, and manganese, from the very rocks in which it sits. Especially in more rural areas, groundwater is frequently contaminated with pesticides and waste disposal from agricultural activities. According to a 2015 study by the United States Geological Survey (USGS), about 13% of Americans supplied their own home water, and over 98% of that water came from groundwater. Importantly, these private wells are not regulated by the Federal Safe Drinking Water Act. Especially in geographical areas with a high-water table, such as parts of Florida, groundwater is also present near or at the ground's surface from rainwater on boggy areas. Considering the massive amount of water on this planet and the sheer scope of its applications, including feeding almost every organism on earth, its contamination should be of paramount concern to every citizen of this planet.

Surface water includes water accessed from rivers, canals, lakes, or artificial reservoirs, for examples. Surface water may also be affected by pesticide run off and other agricultural treatments. Notably and additionally, surface water is easily contaminated by all manner of human and other animal activities, which include but are not limited to, industrial waste, slaughterhouses, garbage, sewage, dead animals, and animal droppings, to name a few. These contaminants represent not only inorganic threats and poisons, but also represent disease threats from bacterial and viral agents.

A 2006 World Health Organization (WHO) document examined the routes of entry of the avian influenza H5N1 virus into water and sewage, the persistence of the virus in the environment, and its possible routes of transmission to humans through water and sewage. While this document was specific to the avian flu H5N1 virus, its findings may well be applicable to other known or unknown viruses, such as the coronavirus that has caused the COVID-19 disease of pandemic proportions without an end yet in sight. The following includes noteworthy observations from the document. Birds infected with H5N1 shed large quantities of virus in their feces, as well as in their saliva and nasal secretions. It is likely that infected droppings or other secretions from both symptomatic and asymptomatic migratory waterfowl will enter water environments where the birds gather. Besides direct deposition of feces into lake water by migratory waterfowl, it has been suggested that fecal waste from duck and chicken farms may spread to bodies of water via wind, surface runoff or possibly enter groundwater through disposal and composting of wastes from poultry farms. Avian flu viruses are known to persist for extended periods of time in water. Their persistence may depend on factors including water temperature, pH, and salinity. Assuming that humans may be infected by the virus through both a fecal-oral and respiratory route, the document notes several possible modes of environmental transmission of H5N1 to humans, including but not limited to: consumption of drinking water contaminated by the virus (e.g. untreated drinking water drawn from a contaminated water body or from a rainwater collection system on a contaminated rooftop); recreational uses (e.g. swimming or bathing) in contaminated water; exposures to the virus in sewage or surface waters where sewage contaminated with the virus has been discharged; and occupational exposures to excreta and infected animals (e.g. sewage treatment, industrial waste, slaughterhouse disposal, level inadequacies and multiple agricultural practices).

There is also evidence that many viruses, including SARS and other coronaviruses, are shed through human urine and feces. According to David J. Weberb & Mark D. Sobseya, *Survival of Surrogate Coronaviruses in Water*, WATER RESEARCH, Vol. 43, Issue 7, pages 1893-1898, for example, coronaviruses can remain infectious for long periods in water and pasteurized settled sewage, suggesting contaminated water is a potential vehicle for human exposure if aerosols are generated. Indeed, it has been determined SARS-CoV-2 RNA concentrations in sewage sludge is highly correlated with the COVID-19 epidemiological curve. Possible transmission paths for viruses are sewage, waters into which sewage flows, and other contaminants whether from animal carcasses or animal waste as well as industrial chemicals and anything those may directly or indirectly contact, such as farm fields and water supplies. As an example, a March 2003 SARS outbreak at a high-rise housing estate in Hong Kong involved over 300 people and was linked to a faulty sewage system. In the U.S., inadequately treated sewage sludge is turned into fertilizer that could end up contaminating food crops. Moreover, it is common for city sewer systems to overflow into rivers and other bodies of water from which irrigation water and especially drinking water may be drawn along with the use of said water for household showering and baths whose penetration through skin pores statistically spread more contamination into humans than does daily consumption of drinking water. Often, there is an overflow of raw untreated sewage.

Some states, such as Washington, allow composting of human remains. Given that some coronavirus infections are asymptomatic, there is the possibility that someone that died of coronavirus could end up composted in a vegetable garden. The thought that the coronavirus might survive in the water of that vegetable garden is unsettling. Even when proper precautions against contamination are taken, mass graves, such as those dug in Hart Island's potter's field to accommodate many of New York City's COVID-19 victims also present a threat of the highly infectious disease reaching drinking water. There are many such examples of hypothetical exposures through water to the coronavirus and other viruses, which include burial grounds for both human and other animal remains without any treatment whatsoever in locations which have shallow water tables.

As discussed above, the actual water sources are prime sources for contamination. The infrastructure needed to bring groundwater or surface water to a building, whether a home or business, city apartment or farm, may also introduce new or increased contaminants to the water being provided. Such infrastructure includes dams, storage tanks, treatment plants, pipes, and aqueducts. Much of this infrastructure was built in the mid-$20^{th}$ century or earlier and is reaching the end of its useful life. Maintenance or replacement of such aging infrastructure is costly and often superseded by emergency repairs. The irony is, of course, that better regular maintenance would likely reduce or eliminate the need for such emergency repairs. Some communities, especially in rural areas, lack the expertise and resources to provide safe drinking water, even when the need is recognized and even championed. Companies that own the infrastructure generally rely on customers to pay for maintenance and upgrades. In poor communities or small communities, the money simply isn't there to defray those costs. The Environmental Protection Agency (EPA) has estimated that $384 billion needs to be invested in local water systems in the coming decades in order to keep water clean. The American Water Works has estimated about $1 billion in investment in the next 25 years to maintain and expand water service. The present invention could offset the extensive cost of infrastructure upgrades, as well as waterborne illnesses caused from the lack thereof.

Of course, water may also become contaminated through day-to-day human activities. Wastewater is produced through household and business or industrial sewage and chemicals or pollutants ever day. This wastewater must be treated before it can be released to the environment in sewage systems or elsewhere. Wastewater treatment methods are well known. Generally speaking, wastewater treatment is divided into primary, secondary, and tertiary treatment and sludge digestion. "In primary treatment, sewage is stored in a basin where solids (sludge) can settle to the bottom and oil and lighter substances can rise to the top. These layers are then removed and then the remaining liquid can be sent to secondary treatment. Sewage sludge is treated in a separate process called sludge digestion. Secondary treatment removes dissolved and suspended biological matter, often using microorganisms in a controlled environment. Most secondary treatment systems use aerobic bacteria, which consume the organic components of the sewage (sugar, fat, and so on). Some systems use fixed film systems, where the bacteria grow on filters, and the water passes through them. Suspended growth systems use 'activated' sludge, where decomposing bacteria are mixed directly into the sewage. Because oxygen is critical to bacterial growth, the sewage is often mixed with air to facilitate decomposition. Tertiary treatment (sometimes called 'effluent polishing') is used to further clean water when it is being discharged into a sensitive ecosystem. Several methods can be used to further disinfect sewage beyond primary and secondary treatment. Sand filtration, where water is passed through a sand filter, can be used to remove particulate matter. Wastewater may still have high levels of nutrients such as nitrogen and phosphorus. These can disrupt the nutrient balance of aquatic ecosystems and cause algae blooms and excessive weed growth. Phosphorus can be removed biologically in a process called enhanced biological phosphorus removal. In this process, specific bacteria, called polyphosphate accumulate organisms that store phosphate in their tissue. When the biomass accumulated in these bacteria is separated from the treated water, these biosolids have a high fertilizer value. Nitrogen can also be removed using nitrifying bacteria. Lagooning is another method for removing nutrients and waste from sewage. Water is stored in a lagoon and native plants, bacteria, algae, and small zooplankton filter nutrients and small particles from the water. Sewage sludge scraped off the bottom of the settling tank during primary treatment is treated separately from wastewater. Sludge can be disposed of in several ways. First, it can be digested using bacteria; bacterial digestion can sometimes produce methane biogas, which can be used to generate electricity. Sludge can also be incinerated, or condensed, heated to disinfect it, and reused as fertilizer," quoting *Wastewater and Sewage Treatment*, at https://bio.libretexts.org/@go/page/12423, accessed on Jan. 12, 2021.

In Boston, for example, wastewater is treated by pumping wastewater influent into a wastewater treatment plant; removing grit and other solids for landfill disposal; removing non-settleable solids through biological and gravity treatment, such as with mixers, reactors, and clarifiers; densifying sludge; anaerobically digesting the sludge into methane gas, carbon dioxide, solid organic byproducts, and water; disinfecting and dechlorinating the water; and discharging the water effluent into Massachusetts Bay. The step of disinfecting and dechlorinating the water may be achieved though adding sodium hypochlorite to kill bacteria in the water and then adding sodium bisulfite to dechlorinate the water. See *The Deer Island Sewage Treatment Plant*, at www.mwra.com/03sewer/html/sewditp.htm, accessed on Jan. 12, 2021.

Given the known problem of water contamination and its potential for illness or death in those that consume that water, water treatment is of paramount importance. Many methods are known for water treatment. These include chemical treatments such as with chlorine or iodine; filtration such as with activated alumina, activated carbon, ceramic or reverse osmosis (RO) filters; exposures to ultraviolet (UV) light; or boiling the water. Each of these methods has advantages and disadvantages. As discussed at length below, long-term chlorine consumption may be poisonous or lethal for humans. Iodine also has many limitations: many people are allergic to iodine; it is light-sensitive; it tastes bad; it is not recommended for long term use; it does not kill parasitic worm eggs and larvae; it does not kill Cryptosporidium, a waterborne, disease spreading protozoan; it does not address chemical contaminants; and it should not be used by people with thyroid problems or on lithium, women over fifty, or pregnant women. Filters usually are ineffective especially for use for more than short-term use and may be expensive and/or bulky. Moreover filters must be regularly changed in order to continue functioning and importantly, there is no single filter that can address all possible pathogens in water. At best, a filter may remove most of some pathogens. Some pathogens may be resistant to UV light and/or heat. Certain strains of the salmonella bacteria, such as S. Senftemberg, S. Heidelberg, S. Typhimirium, and S. Newport, are known to be more heat-resistant for example.

It was noted by Under Secretary (Acting) for Science and Technology at the U.S. Department of Homeland Security, William N. Bryan on Apr. 24, 2020 that some of these methods are effective in inactivating the coronavirus that causes the COVID-19 disease. Specifically, he noted that UV rays or sunlight drastically reduces the half-life of the coronavirus on both surfaces and in the air. He also noted that bleach (or chlorine) kills the coronavirus on surfaces very quickly. Although these observations do not address how these methods would address water contaminated with the coronavirus, the statements are consistent with known methods for water purification.

As mentioned above, chlorine is commonly used in water disinfection. Chlorination is able to not only deactivate microorganisms, such as bacteria and viruses, through disinfection, but is also able to reduce some pesticide concentrations through chemical oxidation. Drinking water quality guidelines from Health Canada note that conventional chlorine treatment can achieve at least an 8-log inactivation of viruses. Most chlorine is added to water in the form of chlorine gas or in the form of sodium hypochlorite also known as bleach. Several factors should be considered in determining how much chlorine to use to treat water. These factors include the water's pH and temperature; how long the water should be exposed to the chlorine for disinfection; and the water quality. Regarding this last, to give a specific example, sufficient chlorine is needed to oxidize both pesticides in water, as well as any other carbon sources present in the water. In other words, there must be sufficient chlorine to address every contaminant. These factors are addressed in *Standards for the Examination of Water and Wastewater*, published by the American Public Health Association, American Water Works Association, and the Water Environment Federation, which details the determination of the chlorine demand by pollutant.

While chlorine is a powerful and useful water disinfectant, it is well known that drinking water that has been disinfected with chlorine may be dangerous. The chlorine has rid the water of one danger but presents another in and of itself. According to the Environmental Protection Agency, Americans consume 300-600 times the amount of chlorine that is safe to ingest. Moreover, chlorine may be inhaled or absorbed through the skin through bathing in water treated with chlorine. Chlorine consumption through ingestion, inhalation, or absorption has been shown to cause or be positively correlated with at least respiratory problems, such as asthma and allergy, sinus, and emphysema conditions; cancer; heart disease; skin irritation; free radical exposure; and an average reduction of a two year lifespan. Beyond these more serious health concerns, chlorine can make water taste and/or smell bad and may irritate the skin. Indeed, in Florida with its high-water table, for example, while it is known that a chlorine inactivation level of 10 logs is necessary to inactivate the contaminants in its water, only 4 logs are used because the higher level leaves such an objectionable aftertaste.

Some methods to inactivate chlorine in water are known. Chlorine will evaporate from water if left long enough. Chlorine may also be removed through boiling water, with the amount of time needed at boiling being dependent on the concentration of chlorine in the water. Filters such as granular activated carbon (GAC), carbon block (CBC), or that marketed under the trademark KDF 55 may also remove chlorine from water (hereinafter KDF 55), though none of these filters guarantee complete chlorine removal and each has its disadvantages. Two forms of vitamin C, ascorbic acids and sodium ascorbate, will also neutralize chlorine. Other chemical compounds, such as sulfur dioxide, sodium thiosulfate, sodium sulfite, or sodium bisulfate, may remove chlorine from water but are toxic or dangerous to handle or result in dangerous byproducts that are an environmental concern. Notably, statistics show that the life expectancy of persons consuming, bathing and swimming in chlorinated water is shorter by an average of two years.

There is a need for a water filtration system that harnesses the disinfecting properties of chlorine while eliminating its disadvantages. Preventing the aggregated costs of illnesses associated with impure water or with water overly treated with chlorine would save hundreds of billions of dollars annually within the U.S. alone.

SUMMARY OF THE INVENTION

The present invention is a system and method for water purification.

In its most basic form, the system of the present invention includes a water inlet that allows water to be treated to enter into a treatment tank; a chlorine source; a heating element; at least one power source; a treated water outlet that allows the treated water to leave the treatment tank and enter at least one storage tank; the at least one storage tank; and a final water outlet.

The water inlet is disposed on the treatment tank so that water to be treated may enter the treatment tank. The water inlet must be able to be opened and closed, such as with an inlet valve or a cap. Water to be treated may be poured directly into a water inlet positioned at the top of the treatment tank. The water to be treated may also be supplied through automation. In embodiments of the system that include a first pump, the water inlet may be disposed anywhere on the treatment tank because the movement of the water to be treated is aided by the pump and need not rely on gravity alone. The water inlet may be connected directly to the water source. The water inlet may include a filter as discussed below. The water inlet may be any commonly used in the art.

The treatment tank may be any relatively large vessel that can withstand both the presence of chlorine and the moderate heat required to bring water to a boil and maintain the boiling for at least the amount of time necessary to inactivate the chlorine. The size of the treatment tank will depend upon available space for the system and the needed recovery volume to satisfy the duration of needs for emergency supplies of potable water for the specific location. A larger treatment tank may purify a larger volume of water at a time, but will take up more space. The water being treated also will be heated to a boiling temperature at least once. As to the power required to heat the water, there may be power efficiencies to heating a large volume fewer times versus a small volume many times or vice versa. As such, tank size versus power consumption for heating may be a balance that is settled based on the user's preference, available space, available power, etc. The treatment tank preferably has a capacity of 300 to 325 gallons. It is preferred that the storage tank(s), discussed below, have similar capacity so as to accommodate all of the treated water from the treatment tank. The treatment tank may also be an odd size or shape so as to fit efficiently into the space where the system is disposed.

The treatment tank preferably includes a steam escape path, such as a vent. Water will be heated to a boil within the treatment tank, and although the treatment tank is preferably made of material durable enough to accommodate the pressure that will build within the treatment tank during this heating, a steam escape path may be a prudent addition. Although the term "steam escape path" is used herein, the term should not be interpreted to imply that the boiling step(s) of the present method, as discussed below, will create only pure water vapor. It is understood that "steam" that may escape through the steam escape path may include chlorine and other impurities. It is therefore preferred that the steam escape path includes a steam filter so that such impurities are not vented into the environment around the system of the present invention. The steam filter may be any type of filter discussed below, but must be able to withstand high heat and humidity. As carbon filters do not work well when hot, carbon filters are not preferred for these purposes. As the steam escape path and its steam filter are most likely to be used when the water to be treated is being heated to a boiling point which is the extent required to inactivate chlorine from the water, it is preferable that the steam filter be capable of filtering chlorine from the resultant steam.

The treatment tank preferably includes a purity monitor. The purity monitor includes a purity test of at least the treated water's pathogen and chlorine content. The purity test is conducted after the water has been treated, but before it leaves the treatment tank. If the purity test concludes that pathogens or chlorine are still present in the treated water, then the purity monitor instructs the system to reheat the water to a boil to eliminate the remaining pathogens and/or chlorine. After this additional heating, another purity test is administered and the steps are repeated until a purity test indicates the water has been purified. Only at this point will the treated water be allowed to advance to the storage tank(s). The purity monitor may also include a display of the outcome of a purity test. The steps of conducting the purity test; reheating if necessary; and eventual passing of the treated water into the storage tank(s) are preferably automated. As such, a display of the purity test results is not necessary, but may be included for informational purposes, such as readjusting the amount of chlorine added and/or the length of time that the chlorinated water is boiled. In some embodiments, however, the steps are not automated. In such embodiments, a display may be necessary so that a user may then manually set the system to reheat. It is preferred that the system keep a record of such purity tests.

The chlorine source is preferably bleach. This form of chlorine has the advantage of being relatively inexpensive and readily commercially available. Calcium hypochlorite which is more commonly used in swimming pools, may also be used. Chlorine gas or any other source of chlorine may also be used. The "chlorine source" may also be any form of iodine commonly used in the art of water purification, such as an iodine tincture (typically a solution of 1.8-7% elemental iodine, along with potassium iodide or sodium iodide, dissolved in a mixture of ethanol and water); iodine crystals; or iodine tablets. As used herein, it is understood that the "chlorine source" may be a source of iodine and that references to "chlorine" being added to water for purification may also refer to iodine.

The chlorine will be added to the water in the treatment tank to deactivate microorganisms in the water through disinfection. The amount of chlorine used will depend on the volume of water being treated. This factor may be limited by the size of the treatment tank. In a standard system, with a 300 to 325 gallon treatment tank, for example, a standard volume of bleach may be added to every 300 gallons (e.g.) of water entering the treatment tank from the water source. This standard volume of bleach may depend on what is known about that water source. If it is known to be of particularly poor quality, for example, a larger volume of bleach may be deployed. Similarly, if specific pollutants are known to be present in the water source, varying amounts of chlorine may be used based on that pollutant. The *Standards for the Examination of Water and Wastewater* may be consulted for this purpose. In some situations, however, little will be known about the water so a maximum amount of bleach may be used to ensure disinfection of whatever microorganisms, pollutants, or other contaminants and in whatever quantities may be present. Such an option may use more bleach than is necessary to disinfect the water, but will add to the user's peace of mind and confidence in the disinfection. Chlorine may be added manually to the treatment tank or added to the treatment tank through an automated chlorine feeder, as discussed below. In some embodiments, as with those that include iodine instead of chlorine, the "chlorine" source does not include chlorine at all, but instead uses another water disinfectant whose lingering presence post disinfection is undesirable and will be treated by the system of the present invention.

The heating element of the system boils the water after it has been exposed to chlorine. The chlorine has rid the water of contaminants and the boiling then rids the water of the chlorine. The heating element is disposed proximate to the treatment tank so that it may boil the chlorinated water therein. It is understood that "proximate to" in this context may mean that the heating element is within the treatment tank. The heating element is preferably electrical, but may be an element commonly used to heat water, such as propane, solar electric photovoltaic (PV) panel(s), a solar hot water system with heat exchangers, a geothermal system, etc., or a combination thereof. For the purpose of disambiguation, it is understood that solar PV systems use sunlight to generate electricity. Solar hot water systems, on the other hand do not generate electricity, but instead heat water directly by having water run through the solar panels as they are heated by the sun, or indirectly by heating a liquid (such as glycol) within the solar panels with the sun and then transferring that heat to the water to be heated through heat exchangers. A solar hot water system, for example, may heat the water directly when sunlight is available, while an electric heating element could take over during the night. Similarly, with an all-electric heating element, solar electric PV panels could provide power while sunlight is available, replacing or supplementing grid power during the day, while the grid would provide all power when the system is run at night or when solar electric output is insufficient to meet demands.

The at least one power source of the system powers any electrical component included in the system. As the heating element is preferably electrical, as discussed above, the power source preferably powers the heating element. If the system also includes any or all of a first or second filter that requires electricity, pH sensor, thermometer, other sensors, automated chlorine feeder, UV light source, first or second pumps, and/or chlorine or system controllers, then the power source will provide the necessary power for these components.

The power source is preferably the electric grid. During normal, non-emergency times, the electric grid will power all electrical components of the system. It is preferred that the power source(s) also include at least one rechargeable battery. This power source is preferably two large rechargeable batteries, such as those used by electric cars, arranged in series so that one may back-up the other and one may charge while the other is in use though they may charge while in use as well. During normal non-emergency times the electric grid will keep the rechargeable batteries charged and then the rechargeable batteries can provide power to the system if the electricity from the grid is not available. In preferred embodiments, the power source includes at least a solar PV panel that is capable of charging the rechargeable batteries. The PV panel may be configured to feed the electric grid during normal, non-emergency times, and to feed the rechargeable batteries when the electric grid is unavailable. Some systems may not have access to the electric grid at all, and a PV panel is especially useful in such arrangements. Other power sources include generators (such as a propane electric generator, for example), non-rechargeable batteries, wind turbines, and hydropower, and any other power source commonly used in the art.

The storage tank(s) are a ready source of purified water at all times, and an important source of potable water available for extended emergencies. One storage tank may be used, but at least two storage tanks are preferable, where each holds 300 to 325 gallons of water, which may be used for drinking and cooking, bathing, plumbing, etc. The customary household uses approximately 70 gallons of water a day. As such, these tanks could provide water for a week or longer to the average household. It is preferred that there are two storage tanks so that one may be filling and treated while the other is in use. It is understood that the 300 gallon volume is fairly arbitrary, however. This sized tank is advantageous in that is easily commercially available, but it is understood that the storage tank or tanks may be larger or smaller than this volume. The space available for the system is, of course, a factor.

In some embodiments, the storage tank(s) includes a UV light source within the tank(s). This will ensure that the air space above the liquid, the inner surface of the tank(s), and the liquid itself all remain disinfected during storage. Such a UV light source may be a germicidal UV lamp but may be any UV light source that is waterproof. The UV light source may be submerged in the liquid or suspended from the top of the tank(s). In some embodiments, the storage tank(s) includes more than one UV light source so that one may be submerged in the liquid and one may be suspended from the top or positioned otherwise. The storage tank(s) may be hooked directly into the water system of a home, business, or other edifice. In some embodiments, the storage tank also includes a second heating element powered by the power source, so that purified hot water may be readily available from the storage tank. The second heating element may be any as discussed above with reference to the first heating element. Such embodiments preferably also include a circulator to ensure hot water is immediately available. The circulator may be set to run on a pre-programmed timer.

In some embodiments, the storage tank also includes a cooling element powered by the power source, so that purified cool or cold water may also be readily available from the storage tank. The cooling element would preferably cool the water to approximately 55° F., which is a typical temperature for household cold/cool water that has neither been heated nor cooled. The cooling element may be a device placed within or integrated with the storage tank that removes heat from the interior of the storage tank. In some embodiments, the storage tank itself is a refrigerated unit, and is therefore both the storage tank and the cooling element. It is understood that some embodiments include neither a second heating element nor a cooling element and the purified water in the storage tanks is left to equilibrate to room temperature.

One of at least ordinary skill in the art will recognize that the storage tanks may include many different configurations. One storage tank may be larger than others, for example for long term or emergency storage. The preference of two at least 300 gallon tanks is presented above, but the system may include many storage tanks to hold the treated water. A smaller storage tank may be deployed inside a small indoor space, but be connected to the system and/or other larger storage tanks out of doors. One or more storage tanks may be designated for cold or room temperature water, and would therefore not include any heating elements. The storage tank may also be odd sized or custom sized for the space in which the system is deployed. It is understood that the system of the present invention may include more than two storage tanks and that the multiple storage tanks need not be of the same size or shape and need not even be in the same location, depending on how the system is deployed.

The treated water outlet connects the treatment tank with the storage tank(s). Water purified in the treatment tank passes through the treated water outlet and is stored in the storage tank(s). The treated water outlet includes at least a first outlet valve that operates to keep the treated water outlet closed when water is not ready to be introduced to the storage tank and to open the treated water outlet when treated water is ready to be introduced to the storage tank. The first outlet valve also preferably controls the flow of treated water between the treatment tank and the storage tank. So as to take advantage of gravity, it is preferred that the treated water outlet be disposed near the bottom of the treatment tank and that the storage tank be situated below this level. As discussed below, however, the system may include a second pump that pumps the treated water into the storage tank(s). In such embodiments, the treated water outlet may be disposed anywhere on the treatment and storage tanks. The treated water outlet may include a pipe between the treatment tank and the storage tank or the treatment tank and storage tank may be situated directly proximate to one another so that the water passes directly between the tanks without that added pipe component. When the treated water outlet includes a pipe, the first outlet valve is preferably disposed on the treatment tank side of the pipe, but may be disposed on the storage tank side of the pipe, or the treated water outlet may include a second outlet valve so that there is a valve in each of these locations. In some embodiments, the treated water outlet includes a second filter, as discussed below.

The final water outlet is attached to at least one storage tank and allows the water to be released to the end user. The preferred system will provide enough purified hot or cold water to the average family home for at least a week, and purify more as water leaves the system through the final water outlet. In some embodiments, the final water outlet includes a pump.

In preferred embodiments, the system also includes a first filter through which water will pass before entering the treatment tank. For the avoidance of doubt, it is understood that the present invention does not require filters of any kind and does not rely upon any one filter or combination of filters discussed below. The first filter is disposed at or near the water inlet. This first filter is preferably either an RO filter or a wound/spun filter, but may also be any water filter commonly used in the art, such as a simple carbon filter, UV filter, or a filter that targets chemical contaminants (as discussed below with reference to the second filter). It is understood that some filters may include several of the listed filters in a single device. It is understood that, unlike the other types of filters listed above, a UV filter may not be a traditional filter through which water actually passes. An RO filter preferably includes three different types of filtration, including a sediment prefilter to screen out larger particulates; a carbon filter to remove organic contaminants; and a semipermeable membrane that is a chemical contaminant filter. Other types of RO filters that may not include all three of these types of filters or that include different types of filters or that include some combination thereof may also be included. The wound or spun filter (hereinafter "wound filter") would filter out sediment only. The wound filter preferably includes a first layer of filtration with a higher micron rating to catch particles of the same size or particles larger than the micron rating and a second layer of filtration with a much lower micron rating that catches smaller particles that slip through the first layer. Although it is preferred that the wound filter be an absolute filter that catches close to 100% of particulates, it is understood that such tight filters lower water pressure through the filter and may require more power for pumping. In the absence of a pump or additional easily accessed power, the wound filter may be a nominal filter that catches most but not all particulates. The first filter may also be a simple pleated filter that generally only filters out particles of uniform size. While a wound filter may be preferable in some ways to a simpler pleated filter, it requires more frequent changing or cleaning and may not be necessary, depending on the water source, as discussed below. It is understood that the sediment prefilter of the RO filter may be either a wound filter or a pleated filter or any other commonly used sediment filter.

The type of first filter used may be tailored to the water source. If it is known that the water source will include a great deal of varied sediment of different sizes, then a wound filter alone or as a part of an RO filter may be preferred. If, on the other hand, the water is likely to have only large sand particles as sediment, a pleated filter along with or as a part of an RO filter may be preferred. It may be preferred to use an RO filter including an absolute wound filter. While this may be necessary for some water sources or desired for peace of mind, it is understood that the more complex the filter, the more complex the system. Moreover, as the water will be treated with chlorine and boiled, any filter may be superfluous.

In preferred embodiments, the system also includes a second filter through which treated water will pass from the treatment tank into the storage tank. The second filter is disposed at or near the treated water outlet. It is preferred that the second filter, if included, be a UV filter. Given that the water has been treated with chlorine and boiled, it should be pure and rid of bacteria and viruses by the time it leaves the treatment tank for the storage tank. However, prior to storage, including a UV filter would kill any remaining bacteria or virus in the water. The second filter may also be a wound or pleated sediment filter or a chemical contaminant filter. A chemical contaminant filter for chlorine may be preferable to remove any remaining chlorine following boiling. Although there should not be any other chemical contaminants in the water at this stage in the purification, other chemical contaminant filters that target chemical contaminants known or suspected to be in the water source, such as arsenic, iron, or sulfur, may also be used as the second filter. A KDF 55 filter or a filter similar to a KDF 55 filter, for example, works well with hot water, to inactivate the chlorine, and may remove any final traces of not only chlorine, but also water-soluble lead, mercury, and chromium, inter alia. As the water treated by the system of the present invention will be heated to a boiling temperature, such a filter that can be used with hot water is therefore desirable. A carbon filter alone or as part of an RO filter may also be used as the second filter, but is not preferred because carbon filters do not work well with heated water. Although the water may cool after boiling before being sent through a carbon filter, this will add time to the filtration process and is therefore not preferred. Moreover, as it is preferred that the treated water stored in the storage tanks also be heated, this added step of cooling the water so as to accommodate a carbon second filter is particularly undesirable. Although the terms "first" and "second" filter are used herein, it is understood that some systems include both a first and second filter; some systems include a first filter but not a second; some systems include a second filter but not a first; and some systems include neither.

In preferred embodiments, the system also includes a pH sensor and/or thermometer disposed either at the very front of the system where the water is coming in from the source or within the treatment tank. As pH and temperature of the water may affect how much chlorine is needed to disinfect the water, the pH sensor and thermometer are useful inclusions to the system. In some embodiments, the system may also include other devices for sensing information about the water, such as the presence and/or concentration of specific contaminants. A thermometer is also particularly useful because it may indicate when the water has reached boiling. Another sensor that may be included with the treatment tank is a pressure gauge. Such a pressure gauge is preferably in communication with the steam escape path so that steam will be vented through the steam escape path if the pressure gauge reads a pressure within the treatment tank that is too high.

In preferred embodiments, the system may also include an automated chlorine feeder. The automated chlorine feeder would be attached to the chlorine source and add chlorine to the treatment tank as water to be treated is introduced to the treatment tank or after the water to be treated has been introduced to the treatment tank. The automated chlorine feeder may be formed so as to always add the same amount of chlorine to every batch of water to be treated. In the preferred embodiments, however, the automated chlorine feeder is a smart device that includes a chlorine control module that may receive input from a user and/or the pH sensor, thermometer, or other sensors if included in the system. A user may set the automated chlorine feeder to add more or less chlorine based on predetermined knowledge of the water and its contaminants; information provided from the sensors; and/or the batch size of the water to be treated, for examples. If the system includes a pH sensor and/or thermometer, the automated chlorine feeder may be in electronic communication with these devices and automatically adjust the amount of chlorine required depending on the pH and/or temperature of the water to be treated. The inclusion of an automated chlorine feeder will make the system easier to use; reduce the user's direct exposure to the chlorine to be added; and reduce the treatment tank to possible contaminant exposure from the user's repeated access to add chlorine.

In preferred embodiments, the system may also include one or more pumps. A first pump may be used to pump water from the water source into the treatment tank. This first pump may be especially preferable if a first filter is used that is tight enough to lower water pressure. A second pump may be used to pump the treated water from the treatment tank into the storage tank(s). Again, this second pump may be especially preferable if a second tight filter is used between the treatment tank and the storage tank(s). Although the terms "first" and "second" pump are used herein, it is understood that some systems include a first and second pump; some systems include a first pump but not a second; some systems include a second pump but not a first; and some systems include neither.

In preferred embodiments, the system may also include one or more alarms. The alarms may indicate any problems occurring with the system, such as a need to reboot, replace batteries, change a filter, etc. An alarm may also indicate any malfunction with the chlorine source, such as the automated chlorine feeder that has overfilled the treatment tank; caused chlorine to leak out of the system; or otherwise caused an unsafe environment around the system of the present invention. The actual indicators of the alarms may be any commonly used in the art, such as a blinking light, a noise, or an automated email to a system user. It is preferred that the alarms are accompanied by instructions or other indications on how to address the problem that prompted the alarm. Such instructions may include, for examples, specifying exactly which filter needs replacing and the exact filter specifications needed for that filter; providing a reference to a specific section of a user manual that provides instructions on addressing such a situation; or providing a troubleshooting code that may be matched with instructions in the user manual.

It is preferred that the entire system include a system control module that electronically controls the system of the present invention. For those systems that include an automated chlorine feeder and chlorine control module, a purity monitor, and/or alarm(s), the system control module is preferably in communication with or combined with the chlorine control module, the purity monitor, and the alarm(s). It is preferred that the system control module include an alarm panel that displays multiple alarm identifications, including shut down functions and signals, such as chlorine alerts as described above.

The system control module would also receive user input on other system functions. These system functions may include turning the system on and off; setting timers for when the system should run; and settings for when and for how long the water needs to be boiled to inactivate the chlorine. How long the water should boil to inactivate the chlorine may depend on the volume of water and amount of chlorine added, which may be inputs into the system control module. The temperature of the water may be relayed to the system control module from a thermometer. Once boiling temperature is reached, the system control module may start a timer for how long the water needs to boil to inactivate the chlorine and then shut the heating element off once the required time has lapsed. The system control module may also monitor the water's temperature as it cools from the boiling temperature. The system control module may only allow the treated water through the treated water outlet into the storage tank(s) once it has reached a specific cooled temperature. In systems where the second filter includes a carbon filter, for example, the filter will not work well if the water is hot, and the system control module may prepare for that. The system control module may also control when and if to use the first and second pumps, if they are included in the system. The system control module may also detect and indicate when the first or second filter or UV light source needs maintenance, cleaning, or replacement, if those components are included in the system. The power source would provide power to the system control module. One of ordinary skill in the art will recognize that the system control module may be used in conjunction with many operations of the system of the present invention, and each of these possibilities is considered to be within the scope of the present invention.

The focus of the present invention is on water purification. It is known that impurities in water may become breathable when such water is vaporized, such as in a humid environment like a shower. The system and method of the present invention result in very pure water.

In its most basic form, the method of the present invention includes the following steps: guiding water to be treated into a treatment tank; adding sufficient chlorine to the treatment tank to purify the water to be treated; applying heat to the treatment tank and boiling the water to be treated; and guiding the treated water into a storage tank. As used herein, "water to be treated" means water through the step of boiling after exposing the water to chlorine and "treated water" means water that has been boiled after exposing the water to chlorine. This method and variations thereof may be used advantageously in conjunction with elements from the egg pasteurization methods disclosed in the inventor's U.S. Pat. Nos. 9,648,888 and 9,949,497, which are hereby incorporated by reference.

Regarding the step of introducing the water to be treated into a treatment tank, this step involves any treatment tank as discussed above with reference to the treatment tank of the system of the present invention. Regarding the step of adding sufficient chlorine to the treatment tank to purify the water to be treated, this step is as described above with reference to the system of the present invention. Importantly, as explained above, adding "chlorine" may also refer to adding iodine. If specific contaminants or quantities thereof are known, the amount of chlorine added may be tailored to the water to be treated and its volume. In many cases, however, particularly when little is known about the quality of the water to be treated, the sufficient amount of chlorine will be a maximum amount that is known will kill all contaminants in any quantity, even if this maximum amount is more than is necessary. The step of adding sufficient chlorine to the treatment tank to purify the water to be treated involves dispersing chlorine from the chlorine source attached to the treatment tank, as described above with reference to the system of the present invention. The chlorine is preferably in the form of bleach, but may be in the form of calcium hypochlorite, chlorine gas, any other chlorine source, iodine tincture, iodine crystals, or iodine tablets. The step of adding sufficient chlorine to the treatment tank to purify the water to be treated may be performed manually or automatically with the aid of an automated chlorine feeder, as described above. It is noted that manual addition of chlorine is not preferred as chlorine is dangerous for humans to handle and breath.

The step of applying heat to the treatment tank and boiling the water to be treated involves boiling the water for a sufficient amount of time to inactivate the chlorine added to the water in the previous step. The length of the boiling will depend on how much chlorine was added. Note that the inactivation of chlorine (or iodine) through boiling is dependent on evaporation. Thus it is the state change achieved by boiling that is required by the method, rather than achieving a specific temperature. The state change of boiling will occur at different temperatures depending on atmospheric pressure and related elevation, so a specific temperature is not required herein. As boiling will almost always require some heat though, applying heat is also a required step to achieve boiling. Care must be taken during this step to consider the volume of water to be treated within the treatment tank and also subsequently to monitor how much air remains within the treatment tank. The pressure created within the treatment tank during this step must be considered and addressed so as to operate the system safely. This step may include the steps of providing a steam escape path from the treatment tank; ensuring that the level of the water within the treatment tank always leaves enough air space above the water for vapor to have sufficient space upon boiling; and/or providing a treatment tank that is structurally strong enough to withstand the pressures created during boiling. In some embodiments the step of applying heat to the treatment tank and boiling the water to be treated includes the steps of monitoring the temperature of the water within the treatment tank; timing the boiling once boiling is achieved as indicated by the water's temperature; and discontinuing the heat once boiling has endured for a sufficient amount of time to inactivate the chlorine.

Some embodiments of the method of the present invention include, after the step of applying heat and boiling in the treatment tank, testing the water for remaining pathogens and/or chlorine. If pathogens are detected, the steps of adding chlorine, applying heat and boiling, and testing are repeated until no pathogens are detected. The treated water may then be sent on to the step of guiding the treated water into the storage tank. If chlorine is detected the steps of applying heat and boiling and testing are repeated until no chlorine is detected. The treated water may then be sent on to the step of guiding the treated water into the storage tank. Repeating these core steps may be preferable under extreme circumstances of highly polluted water or when intelligence surrounding a local water source would dictate the repetition. In such circumstances, the additional step of testing the water for remaining pathogens before adding additional chlorine and reapplying heat and boiling may be eliminated and the core steps may be repeated as a matter of course. As discussed above, filters are not a requirement of the system of the present invention. Repeating these core steps of the method of the present invention may also be particularly preferable with such systems that lack filters but still ensure perfectly clean water as a product.

Regarding the step of guiding the treated water into a storage tank, this step involves any storage tank as discussed above with reference to the storage tank of the system of the present invention.

Some embodiments of the method of the present invention also include the step of guiding water to be treated through a first filter before the water to be treated is guided into the treatment tank. This step involves any filter as discussed above with reference to the first filter of the system of the present invention. As the first filter is preferably integrated with the treatment tank of the present invention, the steps of guiding the water to be treated through the first filter and into the treatment tank are likely performed simultaneously. In some embodiments of the method of the present invention, the steps of guiding water to be treated through a first filter and guiding the water to be treated into a treatment tank include pumping water to be treated through the first filter and into the treatment tank.

Some embodiments of the method of the present invention also include the step of guiding treated water through a second filter before it is guided into the storage tank. This step involves any filter as discussed above with reference to the second filter of the system of the present invention. As the second filter is preferably disposed between the treatment and storage tanks of the present invention, the steps of guiding the treated water through the second filter and into the storage tank are likely performed simultaneously. In some embodiments of the method of the present invention, the steps of guiding treated water through a second filter and guiding the treated water into the storage tank include pumping the treated water through the second filter and into the storage tank.

Some embodiments of the method of the present invention also include the step of exposing the treated water to UV light within the storage tank. This step involves any UV light source as described above with respect to the system of the present invention. Some embodiments of the method of the present invention also include the step of periodically re-boiling the treated water in the storage tanks, so as to ensure the purity of the treated water is maintained during storage.

Some embodiments of the method of the present invention include the steps of identifying one or more contaminants in the water to be treated and adjusting the amount of chlorine to be added in the step of adding sufficient chlorine to address the identified contaminants. The step of identifying one or more contaminants in the water to be treated may be based on common knowledge of an area's source water or testing of the water or other indications. In some embodiments, the step of identifying one or more contaminants also includes determining a concentration or amount of the contaminant in the water to be treated.

Any and all of the embodiments of the method of the present invention discussed above are referred to as the "water purification method." The water purification method of the present invention may be used advantageously as a final step in wastewater and sewage treatment. By treating wastewater effluent with the water purification method of the present invention, perfectly clean and decontaminated water may be discharged into the environment, thereby drastically reducing environmental pollution. Moreover, such water need not even be discharged into the environment. Instead, it may be recycled directly back into water systems for human consumption and use.

The combination of wastewater treatment and the water purification method is referred to hereinafter as the "enhanced method." The enhanced method of the present invention includes the steps of wastewater treatment and then the steps of the water purification method. The steps of wastewater treatment are performed on sewage, where it is understood that sewage includes at least a component of sludge and a component of water to be treated (as defined above with regard to the water purification method). In its most basic form, the steps of wastewater treatment that are included in this enhanced method are at least the steps of receiving a quantity of sewage; and separating the sewage into sludge and water to be treated. The water to be treated is then subjected to the steps of the water purification method described above. The treated water may be safely returned to the environment or reused as pure water for human or industrial purposes.

As discussed in the Background, various steps of wastewater treatment are well known. The very basic steps of receiving the sewage and separating the sewage into sludge and a liquid component will be common to any wastewater treatment. It is understood that many additional and more specific steps are likely also included within the basic step of separating the sludge and liquid components. The separating step may include, for example, removing grit with filters and/or chambers; using gravity to aid in separation; subjecting the sewage to centrifuges to densify the sludge; removing non-settleable solids through biological and gravity treatment; using microorganisms to consume organic matter that does not precipitate out of the liquid component; and adding polymers to aid some of these thickening processes. One of at least ordinary skill in the art will recognize that there are many techniques and variations for separating the sludge and liquid components of sewage. Each of these techniques and variations is considered to be included within the step of the enhanced method of the present invention of separating the sewage into sludge and water to be treated.

The wastewater treatment steps included in the enhanced method of the present invention may also include, after the separating step, the step of digesting the sludge into gases, solid organic byproducts, and a second quantity of water to be treated. This second quantity of water to be treated will also then undergo the water purification steps described above. For the avoidance of doubt, a first quantity of water to be treated is therefore created from the separating step and a second quantity of water to be treated is created from the digesting step, if the digesting step is included in the enhanced method. The first and second quantities of water to be treated may be combined to undergo the steps of the water purification method together. Alternatively, the first and second quantities of water may undergo the steps of the water purification method separately.

Some embodiments of the enhanced method of the present method that include the step of digesting the sludge include the step of using at least a portion of the gases produced during the digesting step to fuel boilers that may be used in the step of applying heat to the treatment tank and boiling the water to be treated, which are steps of the water purification method. A large portion of the gases produced during digestion is likely methane, which may be used, for example, in a gas fired boiler that could be the heating component of the system of the present invention.

The egg pasteurization methods disclosed in the inventor's U.S. Pat. Nos. 9,648,888 and 9,949,497 are hereinafter collectively referred to as the "egg pasteurization method." The water purification method of the present invention may also be advantageously combined with the egg pasteurization method. The first and second heat sources of the egg pasteurization method may be liquid water. The purer this liquid water is, the safer the eggs that are pasteurized with it will be. As such, the treated water product of the water purification method, when heated to appropriate temperatures, may be used as the first and second heat sources of the egg pasteurization method. As such, the combined method, in its most basic form includes the steps of: a) identifying a log level required to inactivate a targeted pathogen in a chicken egg; b) identifying a pasteurization temperature; c) heating at least a portion of the treated water to a temperature that is higher than the pasteurization temperature; d) exposing in-shell chicken eggs to the portion of the treated water that has a higher temperature than the pasteurization temperature (i.e. the first heat source as disclosed in the egg pasteurization method); e) maintaining the exposure of the in-shell chicken eggs to the portion of the treated water that has a higher temperature than the pasteurization temperature until the internal contents of the in-shell chicken eggs reach equilibrium with the pasteurization temperature; f) discontinuing exposure of the in-shell chicken eggs to the portion of the treated water that has a higher temperature than the pasteurization temperature; g) heating at least a portion of the treated water to a temperature that is lower than the pasteurization temperature; h) exposing the in-shell chicken eggs to the portion of the treated water that has a lower temperature than the pasteurization temperature (i.e. the second heat source as disclosed in the egg pasteurization method); i) maintaining the exposure of the in-shell chicken eggs to the portion of the treated water that has a lower temperature than the pasteurization temperature until the outer albumen of the in-shell chicken eggs has cooled to a temperature of less than 128° F. and the inner albumen has cooled to a temperature of no less than 128° F.; j) discontinuing exposure of the in-shell chicken eggs to the portion of the treated water that has a lower temperature than the pasteurization temperature; and k) repeating steps c) through j) until the log level required to inactivate the targeted pathogen of step a) is achieved. One of at least ordinary skill in the art will recognize that any variation of the egg pasteurization method that uses liquid water as its first and second heat sources may be combined advantageously with the water purification method. Each of these variations is considered to be included with the scope of the present invention.

These aspects of the present invention are not meant to be exclusive and other features, aspects, and advantages of the present invention will be readily apparent to those of ordinary skill in the art when read in conjunction with the following description and accompanying drawings.

BRIEF DESCRIPTION OF THE DRAWINGS

FIG. 1 is a diagram of a preferred system of the present invention.

FIG. 3B is a flow chart of the steps of the enhanced method of the present invention.

DETAILED DESCRIPTION

Figure 2A:
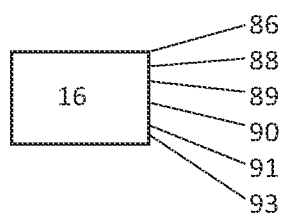
FIGS. 2A-2E are block diagrams indicating options for some components of the present invention.

Referring first to FIG. 1, a block diagram of a preferred embodiment of system 10 of the present invention is provided. It is understood that system 10 as depicted includes all optional components so that every embodiment of system 10 is represented, but that not every component shown is required in more basic embodiments of system 10. System 10 includes water inlet 12; treatment tank 14; chlorine source 16; heating element 18; power source 20; treated water outlet 22; and storage tanks 24. It is understood that the block diagram portrays one possible configuration of system 10 and that it is not necessarily to scale. All configurations that include the required components of system 10 are considered to be within the scope of the present invention, regardless of their similarity or lack thereof to the configuration depicted herein.

Figure 2D:
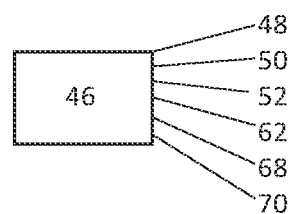

Treatment tank 14 has a capacity of at least 300 gallons to match the capacity of the storage tanks 24, as discussed below. Treatment tank 14 is made of a material that can withstand the heat and pressure of water boiling within, as well as any degrading effects of frequent, extended exposure to chlorine, specifically bleach. Water to be treated is introduced into treatment tank 14 through water inlet 12 and first filter 46. This is achieved with first pump 82, which is particularly advantageous when first filter 46 is a tight filter, such as an RO filter or an absolute wound filter. Referring briefly to FIG. 2D, first filter 46 may be an RO filter 48, a wound filter 50, a pleated filter 52, a UV filter 68, a carbon filter 70, a chemical contaminant filter 62, or a combination thereof. It is understood that first filter 46, in any form, is not a required element of system 10, and is shown herein as an option only.

Again referring to FIG. 1, water inlet 12 includes inlet valve 26 to open and securely close water inlet 12. Treatment tank includes steam escape path 106, such as a vent. Steam escape path 106 may only be used in emergencies when pressure within treatment tank 14 exceeds a safe level. Steam escape path 106 includes steam filter 118 to catch impurities in the steam before they contaminate the environment around system 10. The preferred treatment tank 14 shown includes a pH sensor 72, a thermometer 74, and other sensors 76. These sensors relay information to the chlorine control module 80 and/or the system control module 104, discussed below. Other sensor 76 may be a pressure gauge that communicates with steam escape path 106 to release pressure within treatment tank 14 if pressure reaches an unsafe level. Alarm panel 75 includes identifications of shut down functions and signals.

Chlorine source 16 is attached to treatment tank 14 and functions to provide chlorine to treatment tank 14 to purify the water to be treated within. An automated chlorine feeder 78 is connected to the chlorine source 16 and operates to automate the chlorine provision, thus minimizing the need for handling of the chlorine. The automated chlorine feeder 78 is controlled by chlorine control module 80. Chlorine control module 80 may receive input and commands, such as the amount of chlorine to be added. Other input may include dependencies that affect how much chlorine should be added, such as the pH or temperature of the water to be treated, which may be communicated to chlorine control module 80 from pH sensor 72, thermometer 74, or other sensor 76, discussed above. Referring briefly to FIG. 2A, chlorine source 16 is preferably bleach 86, but may also be calcium hypochlorite 88, chlorine gas 90, iodine tincture 89, iodine crystals 91, or iodine tablets 93.

Figure 2B:
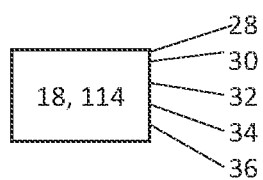

Referring again to FIG. 1, heating element 18 is affixed to treatment tank 14 such that it is able to boil the water to be treated within treatment tank 14. One of ordinary skill in the art will recognize that many heating elements and configurations thereof may be successfully incorporated into system 10 for this purpose. Each of these elements and configurations is considered within the scope of the present invention. Referring briefly to FIG. 2B, heating element 18 may be electric 28, solar PV 30, propane 32, solar hot water 34, or geothermal 36.

Figure 2E:
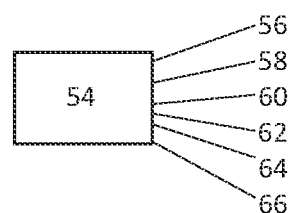
Figure 2C:
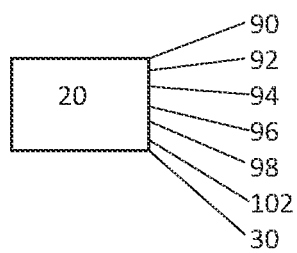

Again referring to FIG. 1, heating element 18 is powered by power source 20. Power source 20 provides power to any system component that requires power or electricity, such as automated chlorine feeder 78 and chlorine control module 80; pH sensor 72, thermometer 74, other sensor 76 and their connections to chlorine control module 80 or system control module 104; purity monitor 120; alarms 126; system control module 104; any automation of valves 26, 40, 42; pumps 82, 84, 116; heating elements 18, 114; cooling element 113; circulator 108 and timer 110; UV light source 38; batteries 92, 96; as well as any heating or electrical options, such as solar PV systems 30, geothermal systems 36, wind turbine systems 98, generators 94, and hydropower systems 102. It is understood that many of these last listed components generate their own power when operated, but some require power when their underlying resource, such as sunlight, wind, or water flow are unavailable. Referring briefly to FIG. 2C, power source 20 may be the electric grid 90, solar PV 30, a rechargeable battery 92, a generator 94, a non-rechargeable battery 96, a wind turbine 98, or hydropower 102. Power source 20 may be any of these sources of power alone, or a combination thereof. A preferred and common power source 20 would be a combination of electric grid 90, solar PV 30, a rechargeable battery 92 (especially a large rechargeable battery similar to those used with electric cars), and a generator 94. This combination utilizes easily available components and includes sufficient redundancy.

Referring again to FIG. 1, treated water outlet 22 allows treated water to pass from treatment tank 14 to storage tank 24. Although treated water outlet 22 may be as simple as a hole in each of treatment tank 14 and storage tank 24 with a first outlet valve 40 between that may be opened and closed to allow or disallow flow, the configuration of the treated water outlet 22 shown in FIG. 1 is preferred. Alarms 126 are in communication with system control module 104 and indicate any problems with system 10 and how to resolve them, such as a need to change a filter or a battery.

Purity monitor 120 administers purity test 122 to treated water before it is allowed to pass through treated water outlet 22. Purity test 122 tests the treated water for the lingering presence of pathogens and/or chlorine. If there are any lingering pathogens and/or chlorine, purity monitor 120 will instruct system 10 to reheat the water. Importantly, the purity monitor 120 would ensure that the water with lingering pathogens and/or chlorine would not leave the system 10 to be provided to the consumer. The results of purity test 122 are displayed on display 124. Treated water passes through second filter 54. Referring briefly to FIG. 2E, second filter 54 may be a UV filter 56, a wound filter 58, a pleated filter 60, a chemical contaminant filter 62, a carbon filter 64, an RO filter 66, or some combination thereof. It is understood that second filter 54, in any form, is not a required element of system 10, and is shown herein as an option only.

Second pump 84 may be included to aid in the transfer of treated water through treated water outlet 22. Second pump 84 is especially desirable if second filter 54 is tight or if treated water outlet 22 is disposed in such a way that the treated water needs to flow against gravity. Treated water outlet 22 includes pipe 44 between treatment tank 14 and storage tank 24 with first outlet valve 40 between treatment tank 14 and pipe 44 and second outlet valve 42 between pipe 44 and storage tank 24. Of the components listed in this preferred version of treated water outlet 22, second outlet valve 42 is the least important and could be omitted. Although FIG. 1 shows a treated water outlet 22 between treatment tank 14 and each of the storage tanks 24, it is understood that system 10 may include only one treated water outlet 22 between treatment tank 14 and only one of the storage tanks 24 (or if there is only one storage tank 24), or system 10 may include a single treated water outlet 22 that is connected to more than one storage tank 24. In other words, rather than filling storage tanks 24 with treated water one at a time, in some embodiments, treated water is introduced to more than one or all storage tanks 24 through one or more treated water outlets 22.

System 10 includes at least one and preferably two storage tanks 24. Storage tanks 24 are preferably at least 300 gallon tanks. At least two are preferable with the idea that at least one would always be full. Each is connected to treatment tank 14 through a separate treated water outlet 22 and then each storage tank 24 is separately connected to the end user's water system or to separate units requiring water. Such a configuration is preferable because storage tank 24 on the left is designated for hot water and storage tank 24 on the right is designated for cold water, as discussed below. This allows the end user to be provided with either warm/hot or cool/cold water (i.e. water around 55° F. that is the average temperature of water that comes out of our taps without being heated or cooled). In some embodiments, however, it is understood that the storage tanks 24 may be connected to one another, so that only one storage tank 24 is connected to treatment tank 14 through water outlet 22 and only one storage tank 24 includes a final water outlet 112 that feeds into the end user's water system/plumbing.

It is understood that system 10 may include more than two storage tanks 24 and that the multiple storage tanks 24 need not be of the same size or shape and need not even be in the same location, depending on how system 10 is deployed. At least one of the storage tanks 24 includes a final water outlet 112 through which the treated water leaves system 10 and is provided to the end user. This may be by connection to the water system of a building or may be as simple as a spigot to provide the end user with water directly from the tank. A final pump 116 may be included to aid in the transfer of the treated water through the final water outlet 112.

Storage tank 24 on the left includes second heating element 114 so that hot treated water may be provided to the end user and so that the treated water may be reheated for purity maintenance. Second heating element 114 is powered by power source 20, and may include any of the options discussed above with reference to FIG. 2B. Storage tank 24 on the right includes cooling element 113. It also includes second heating element 114 as an option to periodically reheat the treated water for purity maintenance. Cooling element 113 provides a ready source of purified cold water to the end user. Cooling element 113 preferably cools the water to approximately 55° F., which is a typical temperature for household cold water. Storage tanks 24 that include second heating element 114, such as the storage tank 24 on the left, also preferably include a circulator 108 with a timer 110 to aid in keeping the treated water uniformly hot. In some embodiments of system 10 that include at least two storage tanks 24, only the final storage tank 24 that connects to the end user's water system includes a second heating element 114 and circulator 108. Storage tanks 24 include UV light source 38 to ensure the treated water remains pure post-treatment while in storage.

Figure 3A:
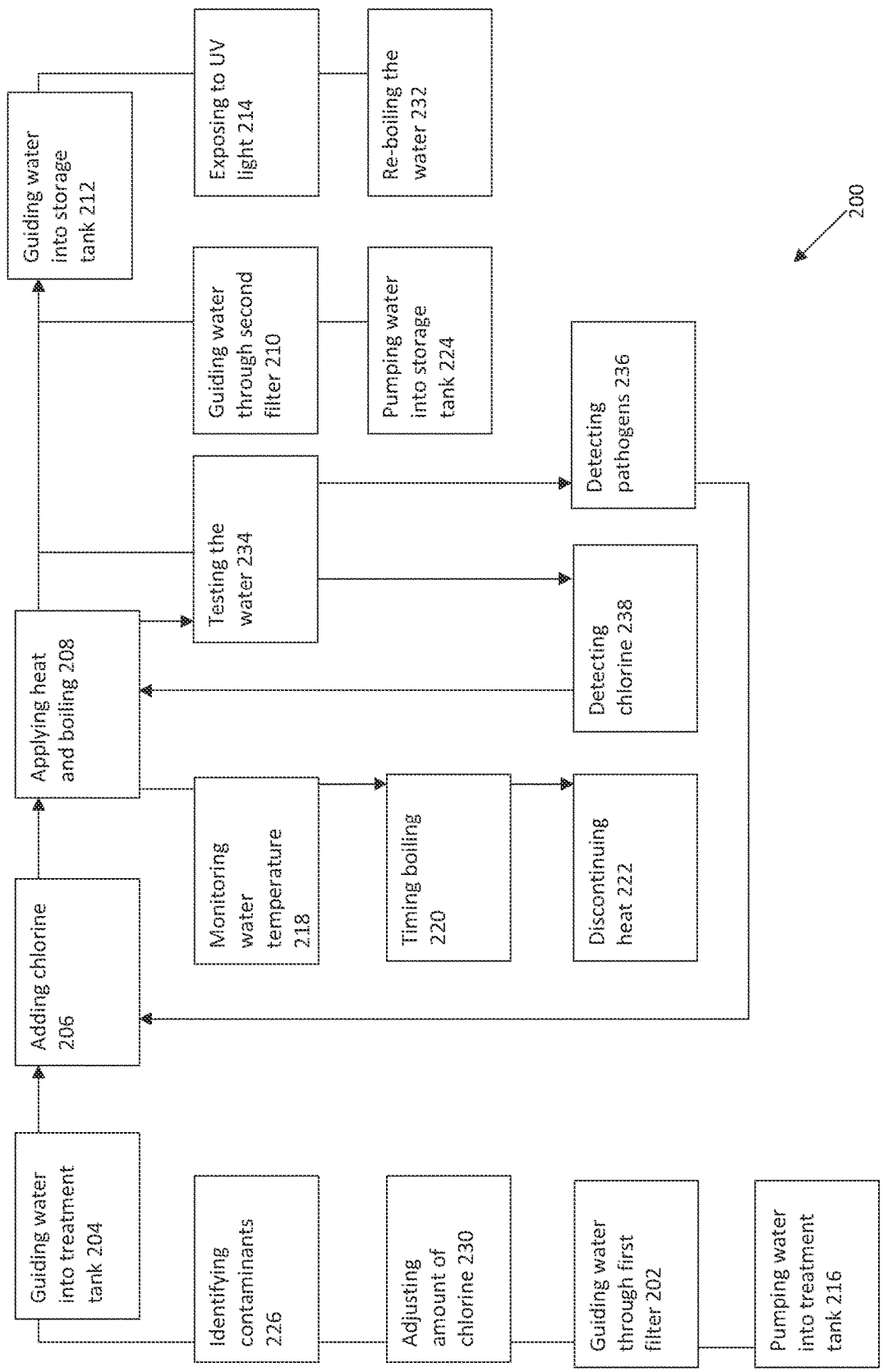
FIG. 3A is a flow chart of the steps of the water purification method of the present invention.

Now referring to FIG. 3A, a flow chart of the steps of method 200 of the present invention is provided. Method 200 includes the following steps: guiding water to be treated into a treatment tank 204; adding sufficient chlorine to the treatment tank to purify the water to be treated 206; applying heat to the treatment tank and boiling the water to be treated 208; and guiding the treated water into a storage tank 212.

Regarding the step of guiding the water to be treated into a treatment tank 204, this step involves any treatment tank 14, as shown and discussed with reference to FIG. 1. Regarding the step of adding sufficient chlorine to the treatment tank to purify the water to be treated 206, this step is as described with reference to system 10 in FIGS. 1 and 2A. Importantly, the step of adding sufficient "chlorine" 206 may be a step of adding sufficient iodine 206. If specific contaminants or quantities thereof are known, the amount of chlorine added may be tailored to the water to be treated and its volume. In many cases, however, particularly when little is known about the quality of the water to be treated, the sufficient amount of chlorine will be a maximum amount that is known will kill all contaminants in any quantity, even if this maximum amount is more than is necessary. The step of adding sufficient chlorine 206 involves dispersing chlorine from the chlorine source attached to the treatment tank, as described with reference to system 10. The chlorine is preferably in the form of bleach 86, but may be in the form of calcium hypochlorite 88, chlorine gas 90, iodine tincture 89, iodine crystals 91, iodine tablets 93, or any other chlorine source. The step of adding sufficient chlorine 206 may be performed manually or automatically with the aid of an automated chlorine feeder 78, as described above.

The step of applying heat to the treatment tank and boiling the water to be treated 208 involves boiling the water for a sufficient amount of time to inactivate the chlorine added to the water in the previous step. The length of the boiling will depend on how much chlorine was added. Care must be taken during this step to consider the volume of water to be treated within the treatment tank and subsequently how much air remains within the treatment tank. The pressure created within the treatment tank during this step must be considered and addressed so as to operate the system safely. As such, this step may include the steps of providing a steam escape path from the treatment tank; ensuring that the level of the water within the treatment tank always leaves enough air space above the water for vapor to have sufficient space upon boiling; and/or providing a treatment tank that is structurally strong enough to withstand the pressures created during this heating. In some embodiments the step of applying heat to the treatment tank and boiling the water to be treated 208 includes the steps of monitoring the temperature of the water within the treatment tank 218; timing the boiling once boiling is achieved as indicated by the water's temperature 220; and discontinuing the heat once boiling has endured for a sufficient amount of time to inactivate the chlorine 222.

Some embodiments of method 200 of the present invention also include the step of guiding water to be treated through a first filter 202 before the step of guiding the water to be treated into the treatment tank 204. This step 202 involves any first filter 46 of system 10, as shown and discussed with reference to FIGS. 1 and 2D. As first filter 46 is preferably integrated with treatment tank 14, these first two steps 202, 204 are likely performed simultaneously. In some embodiments of method 200, the steps of guiding water to be treated through a first filter 202 and introducing the water to be treated into a treatment tank 204 include pumping water to be treated through the first filter and into the treatment tank 216.

Some embodiments of method 200 of the present invention also include the step of guiding treated water through a second filter 210 before the step of guiding the treated water into the storage tank 212. This step 210 involves any second filter 54 of system 10, as shown and discussed with respect to FIGS. 1 and 2E. Regarding the step of introducing the treated water into a storage tank 212, this step involves any storage tank 24 of system 10, as discussed above. As second filter 54 is preferably disposed between treatment 14 and storage tanks 24, these two steps 210, 212 are likely performed simultaneously. In some embodiments of method 200, the steps of guiding treated water through a second filter 210 and introducing the treated water into the storage tank 212 include pumping the treated water through the second filter and into the storage tank 224. Regarding the step of exposing the treated water to UV light within the storage tank 214, this step involves any UV light source 38, as discussed above.

Some embodiments of method 200 of the present invention also include the step of exposing the treated water to UV light within the storage tank 214. This step 214 involves any UV light source 38 as discussed above. Some embodiments of the method of the present invention include, after the step of applying heat and boiling in the treatment tank 208, testing the water for remaining pathogens and/or chlorine 234. If pathogens are detected 236, the steps of adding chlorine 26, applying heat and boiling 208, and testing 234 are repeated until no pathogens are detected. The treated water may then be sent on to the step of guiding the treated water into the storage tank 212. If chlorine is detected 238, the steps of applying heat and boiling 208 and testing 234 are repeated until no chlorine is detected. The treated water may then be sent on to the step of guiding the treated water into the storage tank 212.

Some embodiments of method 200 of the present invention include the steps of identifying one or more contaminants in the water to be treated 226 and adjusting the amount of chlorine to be added 230 in the step of adding sufficient chlorine to address the identified contaminants. The step of identifying one or more contaminants in the water to be treated 226 may be based on common knowledge of an area's source water or testing of the water or other indications. In some embodiments, the step of identifying one or more contaminants 226 also includes determining a concentration or amount of the contaminant in the water to be treated.

Some embodiments of method 200 of the present invention include an additional step of re-boiling the treated water in the storage tanks 232. This step 232 ensures the continued purity of the treated water during storage.

Now referring to FIG. 3B, a flow chart of the steps of the enhanced method 300 of the present invention, combining wastewater treatment and the water purification method 200 of the present invention is provided. In its most basic form, enhanced method 300 includes the steps of receiving a quantity of sewage 302; separating the sewage into sludge and water to be treated 304; and the steps of any of the embodiments of the water purification method 200 disclosed herein.

Various steps of wastewater treatment are well known. The very basic steps of receiving the sewage and separating the sewage into sludge and a liquid component will be common to any wastewater treatment. It is understood that many additional and more specific steps are likely also included within the basic step of separating the sludge and liquid components 304. The separating step 304 may include, for example, removing grit with filters and/or chambers; using gravity to aid in separation; subjecting the sewage to centrifuges to densify the sludge; removing non-settleable solids through biological and gravity treatment; using microorganisms to consume organic matter that does not precipitate out of the liquid component; and adding polymers to aid some of these thickening processes.

Enhanced method 300 may also include, after the separating step 304, the step of digesting the sludge into gases, solid organic byproducts, and a second quantity of water to be treated 306. This second quantity of water to be treated will also then undergo at least steps 204, 206, 208, and 212, described above. For the avoidance of doubt, a first quantity of water to be treated is therefore created from the separating step 304 and a second quantity of water to be treated is created from the digesting step 306, if the digesting step 306 is included in the enhanced method 300. The first and second quantities of water to be treated may be combined to undergo the steps of the water purification method 200 together. Alternatively, the first and second quantities of water may undergo the steps of the water purification method 200 separately.

Some embodiments of enhanced method 300 that include the digesting step 306 also include the step of using at least a portion of the gases 308 produced during the digesting step to fuel boilers that may be used in the step of applying heat to the treatment tank and boiling the water to be treated 208, which are steps of the water purification method 200. A large portion of the gases produced during digestion is likely methane, which may be used, for example, in a gas fired boiler that could be the heating component of the system of the present invention.

Finally, the present invention also includes a combination of the water purification method 200 performed before the egg pasteurization method when the egg pasteurization uses liquid water for its first and second heat sources.

Although the present invention has been described in considerable detail with reference to certain preferred versions thereof, other versions would be readily apparent to those of ordinary skill in the art. Therefore, the spirit and scope of the description should not be limited to the description of the preferred versions contained herein.

I claim:

1. A water purification system for purifying water to be treated into treated water, said water purification system comprising:
    a treatment tank;
    a water inlet disposed on said treatment tank such that water to be treated passes through said water inlet into said treatment tank;
    a chlorine source disposed such that said chlorine source provides chlorine to said treatment tank;
    a heating element disposed proximate to said treatment, tank such that said heating element boils the water to be treated within said treatment tank;
    a power source that powers at least said heating element;
    at least one storage tank;
    at least one treated water outlet disposed between said treatment tank and said at least one storage tank such that treated water passes from said treatment tank to said at least one storage tank; and
    a final water outlet disposed on said at least one storage tank.

2. The water purification system as claimed in claim 1, further comprising a first filter disposed proximate to said water inlet such that the water to be treated that passes through said water inlet into said treatment tank is filtered by said first filter.

3. The water purification system as claimed in claim 1, further comprising a second filter disposed proximate to said at least one treated water outlet such that the treated water that passes from said treatment tank into said at least one storage tank is filtered by said second filter.

4. The water purification system as claimed in claim 1, further comprising a first pump disposed proximate to said water inlet such that said first pump pumps water to be treated through said water inlet into said treatment tank.

5. The water purification system as claimed in claim 1, further comprising a second pump disposed proximate to said at least one treated water outlet such that said second pump pumps treated water through said at least one treated water outlet into said at least one storage tank.

6. The water purification system as claimed in claim 1, wherein said water inlet comprises an inlet valve that opens and closes said water inlet.

7. The water purification system as claimed in claim 1, wherein said at least one treated water outlet comprises a first outlet valve that opens and closes said at least one treated water outlet.

8. The water purification system as claimed in claim 7, wherein:
    said at least one treated water outlet further comprises a pipe disposed between said treatment tank and said at least one storage tank; and
    said first outlet valve is disposed between said treatment tank and said pipe.

9. The water purification system as claimed in claim 1, further comprising at least one UV light source disposed within said at least one storage tank and powered by said power source.

10. The water purification system as claimed in claim 1, wherein said at least one storage tank comprises at least two storage tanks, wherein each of said at least two storage tanks has a capacity of at least 300 gallons.

11. The water purification system as claimed in claim 1, further comprising one of a group consisting of a pH sensor; a thermometer; and a pH sensor and thermometer disposed within said treatment tank.

12. The water purification system as claimed in claim 1, further comprising an automated chlorine feeder disposed proximate to said chlorine source such that said automated chlorine feeder adds chlorine from said chlorine source to said treatment tank.

13. The water purification system as claimed in claim 12, wherein said automated chlorine feeder comprises a chlorine control module that controls said automated chlorine feeder.

14. The water purification system as claimed in claim 1, wherein the chlorine provided by said chlorine source into said treatment tank is in the form of bleach.

15. The water purification system as claimed in claim 1, further comprising a system control module that electronically controls said system and is in communication with at least said heating element and is powered by said power source.

16. The water purification system as claimed in claim 1, wherein said at least one storage tank comprises a second heating element powered by said power source.

17. The water purification system as claimed in claim 1, further comprising a final pump disposed proximate to said final water outlet such that said final pump pumps treated water out of said system, wherein said final pump is powered by said power source.

18. The water purification system as claimed in claim 15, wherein said treatment tank comprises a purity monitor in communication with said system control module, said purity monitor comprising a purity test.

19. The water purification system as claimed in claim 18, wherein said purity monitor further comprises a display of a result of said purity test.

20. The water purification system as claimed in claim 15, further comprising at least one alarm in communication with said system control module, wherein said alarm indicates a problem with said system.

21. The water purification system as claimed in claim 1, wherein said at least one storage tank comprises a cooling element.

* * * * *